United States Patent
Cedervall et al.

[19]

[11] Patent Number: 6,011,974
[45] Date of Patent: Jan. 4, 2000

[54] METHOD AND SYSTEM FOR DETERMINING POSITION OF A CELLULAR MOBILE TERMINAL

[75] Inventors: Mats Cedervall, Vallentuna; Patrik Lundqvist, Stockholm, both of Sweden

[73] Assignee: Telefonaktiebolaget L M Ericsson (publ), Stockholm, Sweden

[21] Appl. No.: 08/935,421

[22] Filed: Sep. 23, 1997

[51] Int. Cl.⁷ ...................................................... H04Q 7/20
[52] U.S. Cl. ............................................. 455/456; 342/457
[58] Field of Search ........................................ 455/456, 457, 455/502, 524; 342/457, 357, 450, 463, 464, 357.01, 357.08, 357.09, 357.1; 370/320, 335, 342

[56] References Cited

U.S. PATENT DOCUMENTS

| | | | |
|---|---|---|---|
| 3,646,580 | 2/1972 | Fuller et al. | 455/456 |
| 5,423,067 | 6/1995 | Manabe | 455/56.1 |
| 5,508,708 | 4/1996 | Ghosh et al. | 342/457 |
| 5,515,062 | 5/1996 | Maine et al. | 342/457 |
| 5,542,100 | 7/1996 | Hatakeyama | 455/56.1 |

FOREIGN PATENT DOCUMENTS

| | | |
|---|---|---|
| 0 335 558 A2 | 10/1989 | European Pat. Off. . |
| 0 800 319 A1 | 10/1997 | European Pat. Off. . |
| 44 09 178 A1 | 9/1995 | Germany . |
| 195 28 616 A1 | 2/1997 | Germany . |
| WO 92/05672 | 4/1997 | WIPO . |

OTHER PUBLICATIONS

ISR for RS 100199 US Completed on Feb. 27, 1998, Date Mar. 3, 1998, EPX.

*Primary Examiner*—Lee Nguyen
*Attorney, Agent, or Firm*—Jenkens & Gilchrist, P.C.

[57] ABSTRACT

A method and system are disclosed by which a round-trip calculation is used to determine the distance between a mobile radio station (MS) and a radio base station (BS) using the apparent uplink and downlink signal propagation air-times (e.g., T-up and T-down). As such, no absolute time reference is required. The MS and BS report to a service node in the mobile network the local departure and arrival times of the uplink and downlink signals, and calculate the apparent air-times, T-up and T-down. The distance, D, between the MS and BS can be calculated as $D=c(T\text{-}up+T\text{-}down)/2$, where "c" equals the speed of light. The distances, D1, D2 and D3, to at least three base stations whose locations are known, can be used in a triangulation algorithm to determine the MS's position.

26 Claims, 3 Drawing Sheets

METHOD AND SYSTEM FOR DETERMINING POSITION OF A CELLULAR MOBILE TERMINAL

BACKGROUND OF THE INVENTION

1. Technical Field of the Invention

The present invention relates in general to the mobile radio communications field and, in particular, to an improved method and system for determining the position of a mobile radio terminal.

2. Description of Related Art

In the cellular communications field, it has become increasingly important to be able to determine the position of mobile radio terminals. As such, authorities responsible for defining mobile radio communications system specifications and standards are currently involved in the process of specifying the accuracies required in performing mobile terminal position determinations. The most successful methods used so far to determine the position of mobile terminals are based on measurements of signal propagation times, which in turn, are then used to derive distances. These propagation time measurements are made on either the uplink (base station measurements of transmissions from a mobile terminal) or downlink (mobile terminal measurements of transmissions from a base station).

For example, World Intellectual Property Organization Patent Application Publication No. WO 96/35958 to Ghosh et al. ("Ghosh") discloses a method and system for determining the position of a mobile terminal in a Code Division Multiple Access (CDMA) communications system (e.g., in accordance with the IS-95 standard). The Ghosh application teaches a method by which measurements of the absolute time of arrival (TOA) of a signal transmitted by a mobile terminal are made in at least two base stations. These TOA measurements are converted to distances. Triangulation is used to determine the mobile terminal's position. However, a problem with the disclosed TOA method of position determination is that it requires the use of a highly accurate or "exact" time reference (e.g., as provided by the space-based Global Positioning System or GPS).

Patent Cooperation Treaty (PCT) Patent Application Serial No. PCT/SE97/00219 (and related U.S. patent application Ser. No. 08/799,039) to Lundqvist et al. ("Lundqvist") discloses a method and apparatus for determining the position of a mobile terminal in an unsynchronized environment (e.g., without using an "exact" time reference). Instead, a plurality of fixed location "reference" radio terminals whose positions are known are used to make downlink propagation time measurements. The relative transmission time offset between base stations is determined and used to derive the position of the mobile terminal.

PCT Patent Application Serial No. PCT/SE96/03561-3 (and related U.S. patent application Ser. No. 60/028,345) to B. Bergkvist et al. ("Bergkvist") discloses a method and apparatus for determining the position of a mobile terminal in a cellular mobile radio system such as, for example, the Global System for Mobile Communications (GSM). A mobile terminal is ordered to perform a sequence of handovers to several target base stations. As such, the mobile terminal transmits an access burst to a target base station. However, that target base station does not transmit a confirmation message that the access burst was received. The mobile terminal then reverts back to its serving base station. That target base station uses the received access burst to measure the round-trip propagation delay (base station-mobile terminal-base station). Consequently, a time reference signal is not needed to derive the mobile terminal's position.

A disadvantage of the method disclosed in the above-described Ghosh application is that the base stations are required to use a global time reference, such as a GPS signal, to accurately determine a mobile terminal's position. Similarly, although the method disclosed in the Lundqvist application avoids the use of a global time reference, instead it uses a complex system of fixed location "reference" radio terminals whose positions are known, in order to derive relative base station timing offsets. A disadvantage of the Bergkvist application is that it uses measurements of round-trip propagation delays from performing a sequence of aborted handovers. This method takes a considerable amount of time to complete, and it creates substantial disturbances by transmitting individual access bursts to several base stations. However, these access bursts are generated only for the purpose of determining the position of the mobile terminal.

Notably, it is desirable to determine the position of a mobile terminal without the use of complex time references, "reference mobile terminals, and "disturbing" aborted handovers, and instead be able to utilize the basic functions of the cellular mobile radio system. As described below, the present invention successfully provides this capability and resolves the above-described problems.

SUMMARY OF THE INVENTION

One problem addressed by the present invention is how to measure the distance between a base station and a mobile station without having to use a global time reference.

Another problem addressed by the present invention is how to determine the geographical position of a mobile terminal in a non-synchronized mobile radio system (without a global time reference) while eliminating the need for additional position determination equipment (e.g., "reference" radio terminals for determining time offsets between base stations).

Still another problem addressed by the present invention is how to determine the geographical position of mobile radio terminals without creating unnecessary "disturbances" (e.g., access bursts transmitted for aborted hand-overs).

It is, therefore, an object of the present invention to provide a method and system for determining the position of a mobile terminal operating in a conversational mode directly on a digital or analog (but capable of carrying digital information) traffic channel of a mobile radio system.

It is another object of the present invention to provide a method and system that meets the above-described object, wherein the mobile radio system is, for example, a CDMA, Wide-band CDMA (WCDMA), or Time Division Multiple Access (TDMA) system.

It is a further object of the present invention to provide a method and system that meets the above-described objects, wherein the position determination function is performed by a system that transmits and makes measurements on information patterns known in advance (i.e., not requiring the transfer of variable information).

It is yet another object of the present invention to provide a method and system that meets the above-described objects, wherein the relative time offsets of transmissions from radio base stations can be determined using one mobile terminal, and then applied to determine the position of other mobile terminals.

In accordance with the present invention, the foregoing and other objects are achieved by a novel method and system for determining the position of mobile terminals in a cellular mobile radio system. Drawing an analogy to the air traffic field, in consulting an air traffic time-table, it can be seen that aircraft departures and arrivals are shown with local times. Considering an East-West air traffic connection between two cities (e.g., Dallas and Stockholm), the local times in these cities can differ by up to several hours. Consequently, the apparent air-time needed to fly from the one city to the other (e.g., Dallas to Stockholm) differs from the apparent air-time needed to fly that route in the opposite direction (e.g., Stockholm to Dallas), if the local times are used to calculate arrival times in the time-table. However, it is relatively easy to calculate the real air-time for a traveler, by adding the apparent air-time for the East-to-West trip (e.g., Dallas to Stockholm) to the apparent air-time for the return trip (e.g., Stockholm to Dallas), and dividing the result by two. Essentially, utilizing this "round-trip" calculation method, the time "lost" traveling in one direction is time "gained" traveling in the other direction, and the result is independent of the local times involved. Ultimately, in order to determine the distance between the two cities, the calculated real-time can be multiplied by the speed of the aircraft that made the trip.

Similarly, in accordance with the present invention, a round-trip calculation method is used to determine the distance between a mobile radio station (MS) and a radio base station (BS) using the apparent uplink and downlink signal propagation air-times (e.g., T-up and T-down). As such, no absolute time reference is required. The MS and BS report to a service node in the mobile network the local departure and arrival times of the uplink and downlink signals, and calculate the apparent air-times, T-up and T-down. The distance, D, between the MS and BS can be calculated as:

$$D = c(T\text{-up} + T\text{-down})/2, \qquad (1)$$

where "c" equals the speed of light.

In accordance with a first embodiment of the present invention, the distance between a MS and a particular radio base station (BS1) can be determined by the following novel round-trip method. A first measurement order is sent by a network controller (e.g., Mobile Services Switching Center or MSC) to BS1, which orders BS1 to measure the local time-of-arrival (L-TOA-U) of a first signal (e.g., a conventional raining sequence) to be transmitted (uplink) by the MS within a specified time window. With respect to a downlink transmission, BS1 normally transmits a second signal periodically on the downlink (e.g., a pilot signal in a WCDMA system) at the local times-of-transmission (L-TOT-D). These second signals can be received by all MSs, which makes it unnecessary for the network controller to order BS1 to send a dedicated signal downlink at a specified time. The network controller sends a second measurement order to the MS via its serving BS (BS0), which orders the MS to transmit the first signal (uplink) within the specified time window, and report its exact local time-of-transmission (L-TOT-U). The second measurement order also orders the MS to measure and report the local time-of-arrival (L-TOA-D) of the second signal (downlink) transmitted by BS1. Additionally, the first and second orders identify the downlink and uplink radio channels to be used for the above-described transmissions and measurements. The MS and BS1 report the respective L-TOA-D and L-TOA-U measurements to the network controller, which forwards this information together with the identity of the MS to a processor in the network service node. Using a form of Equation 1 shown above, the processor calculates the distance between the MS and BS1.

In accordance with a second embodiment of the present invention (e.g., in a CDMA or WCDMA system), the air-time from a MS to a serving BS (BS1) can be determined by a novel method, which sets up a connection (e.g., a call) between the BS0 and the MS. A conventional matched filter technique can be used to determine the round-trip delay for the connection. The value of the resulting round-trip delay is divided by two, and the result is multiplied by the speed of light, which gives the distance between the MS and BS0. The same method can be used to determine the distance between the MS and two neighboring BSs (BS1, BS2). A conventional triangulation algorithm is then used to determine the position of the MS.

In accordance with a third embodiment of the present invention (e.g., in a TDMA system), the air-time from a MS to a serving BS (BS0) is determined by a conventional Timing Advance (TA) technique. As in the second embodiment, a conventional matched filtering approach can be used to determine the round-trip delay. The distance between the MS and BS0 is calculated by dividing the round-trip delay value by two, and multiplying the result by the speed of light. Again, the same method can be used to determine the distance between the MS and two neighboring BSs (BS1, BS2). A conventional triangulation algorithm is then used to determine the position of the MS.

In accordance with a fourth embodiment of the present invention, the position derived for one MS (MS1), and the derived distances from that MS1 to neighboring base stations (e.g., BS1, BS2, etc.) are used by a network service node to determine the (transmission) time offsets of those neighboring BSs relative to the MS1's serving BS (BS0). The position of a second MS (MS2) is then determined according to a conventional either uplink or downlink TOA method. Note, as a practical matter, that the position derived for MS1 should have been determined recently before the measurements of MS2, since the clocks of the BSs can drift. The neighboring BSs report the TOA in local time to the service node via a network controller (e.g., MSC). The service node already knows the time offsets of the neighboring BSs.

In accordance with a fifth embodiment of the present invention, a radio BS is provided for determining the position of a MS using a round-trip position determination approach. The BS includes a control device having a local clock. The control device, in response to receiving a report order, reports the downlink local time-of-transmission (L-TOT-D) and uplink local time-of-arrival (L-TOA-U) of a downlink and uplink timing sequence between the BS and MS. The BS also includes a transmitter, which reports to the control device the instant in time that a signal is transmitted on the downlink (L-TOT-D). A receiver is also included, which uses a matched filter or sliding correlator to determine the instant in time a signal is received on the uplink (L-TOA-U). The receiver reports this time information to the control device.

In accordance with a sixth embodiment of the present invention, a radio MS is provided for determining it's own position using the round-trip position determination approach as used for the BS in the fifth embodiment. The radio MS includes a control device having a local clock. The control device, in response to receiving a report order, reports the uplink local time-of-transmission (L-TOT-U) and downlink local time-of-arrival (L-TOA-D) of the downlink and uplink timing sequence between the MS and the radio BS. The MS also includes a transmitter, which reports to the control device the instant in time that a signal is transmitted on the uplink (L-TOT-U). A receiver is also included, which uses a matched filter or sliding correlator to determine the instant in time a signal is received on the downlink (L-TOA-D). The receiver reports this time information to the control device.

An important technical advantage of the present invention is that the position determination method used does not require time-synchronized BSs, a time reference, or "reference" terminals with known positions. Also, the present invention does not generate unnecessary access burst "disturbances".

Another important technical advantage of the present invention is that it can be applied to any mobile communications system, including, for example, a CDMA, WCDMA, TDMA, frequency division multiple access (FDMA), or analog system, provided that such a system is capable of conveying digital information on the uplink and downlink, and it's BSs and MSs are capable of measuring local transmission and arrival times.

Still another important technical advantage of the present invention is that it is still possible to use a time reference (e.g., GPS reference signal) in the BSs, which makes it unnecessary to have either downlink or uplink measurements made.

Yet another important technical advantage of the present invention is that it makes it possible to use a MS whose position has been determined, as a "reference" terminal for the purpose of determining the timing offsets of neighboring BSs. Consequently, the present invention advantageously decreases the number of measurements needed to determine the position of other MSs.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
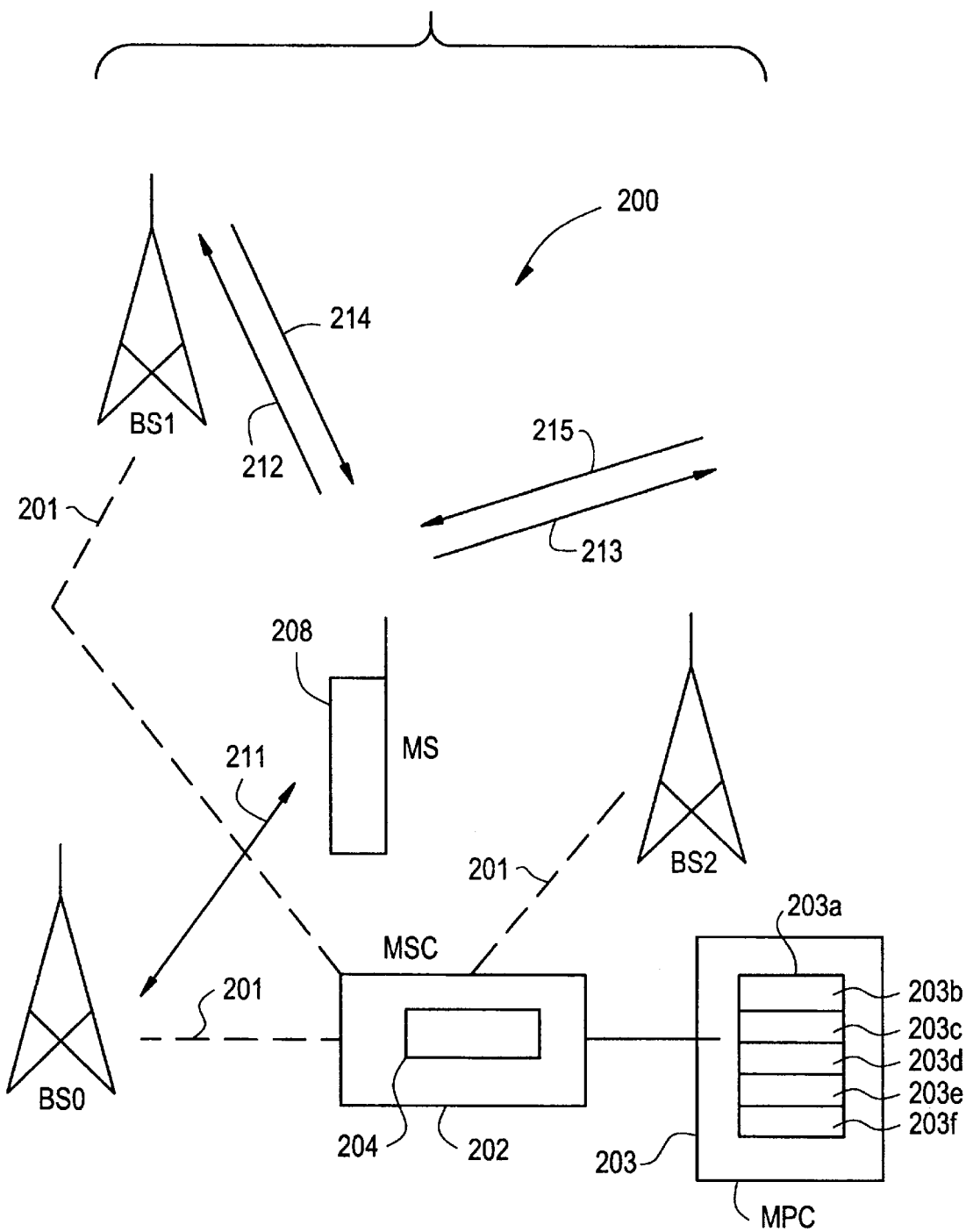
FIG. 1 is a schematic block diagram of a cellular mobile radio system, which can be used to implement a method for determining the position of a mobile radio station (without requiring the use of a time reference), in accordance with a preferred embodiment of the present invention.
Figure 2:
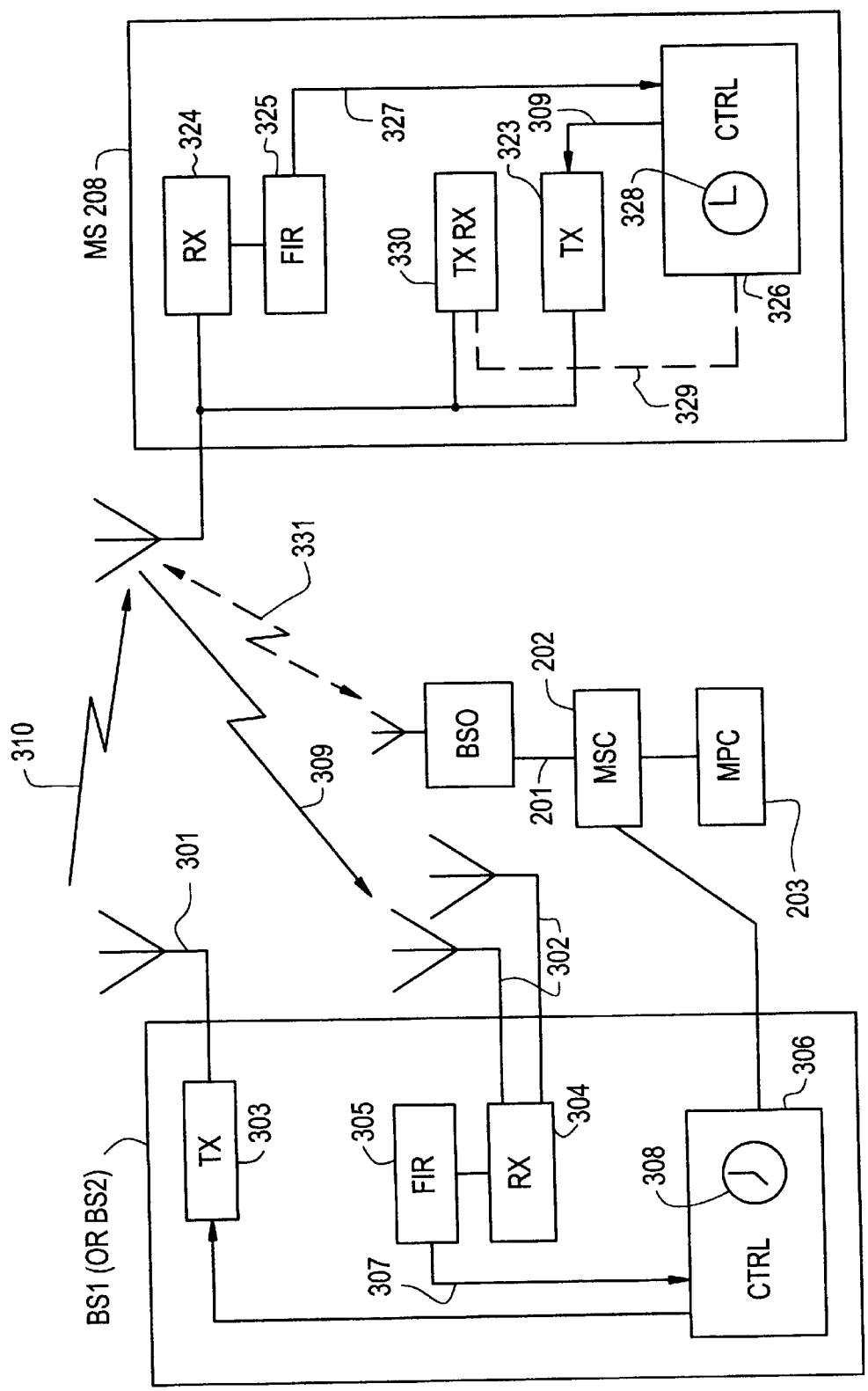
FIG. 2 is a schematic block diagram of a radio base station and mobile radio station, which are structured in accordance with respective embodiments of the present invention.
Figure 3:
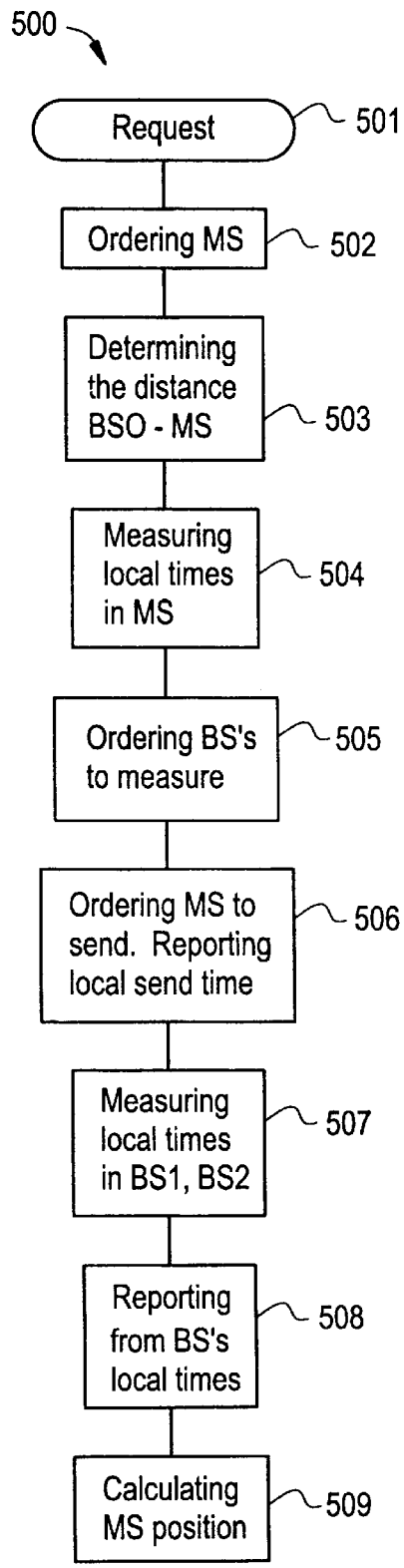
FIG. 3 is a flow diagram that shows a method for determining the position of a mobile radio station, which can be implemented by the embodiments shown in FIGS. 1 and 2.

The preferred embodiment of the present invention and its advantages are best understood by referring to FIGS. 1–3 of the drawings, like numerals being used for like and corresponding parts of the various drawings.

FIG. 1 is a schematic block diagram of a cellular mobile radio system 200, which can be used to implement a method for determining the position of a mobile radio station (without requiring the use of a time reference), in accordance with a preferred embodiment of the present invention. System 200 includes a plurality of radio base stations. For clarity, only three base stations of that plurality of radio base stations are shown: BS0 (serving base station for a mobile radio station whose position is to be determined); and two neighboring base stations BS1 and BS2. Preferably, BS0, BS1 and BS2 are located at different sites to define different cells, and all are connected to a wirebound network (e.g., Public Land Mobile Network or PLMN) via communication links 201. For the exemplary embodiment shown, this network includes a network controller, such as, for example, a mobile services switching center (MSC) 202, which is connected via a Public Switched Telephone Network or PSTN (not explicitly shown) to a service node mobile positioning center (MPC) 203. The MSC 202 includes a memory storage area with a look-up table 204, which relates specific radio channels to specific mobile radio stations (e.g., MS 208). The look-up table (204) function allows the MSC 202 to report to the service node MPC 203 uplink and downlink signal transmission and arrival times, and relate those times to the mobile station(s) involved (e.g., MS 208). Each MS communicates with a BS via a radio air interface (e.g., air interface 211 between BS0 and MS 208).

For this embodiment, the service node MPC 203 includes a processor 203a, which further includes a receiving unit 203b, storage unit 203c, sending unit 203d, and first and second calculating units 203e and 203f, respectively. The processor 203a maintains the geographical position information for each of the BSs in storage unit 203c. The calculating units 203e and 203f are utilized to calculate the position of the MSs involved (e.g., MS 208), using the stored BS position information and reported local transmission times and arrival times (from MSC 202) for the uplink and downlink signals.

For example, the first calculating unit 203e can be utilized to calculate the round-trip distance, D, between a MS (e.g., MS 208) and a BS (e.g., BS1) as follows:

$$D=c(T\text{-up}+T\text{-down})/2, \tag{2}$$

from the reported local transmission times (L-TOT-U, L-TOT-D) and local arrival times (L-TOA-U, L-TOA-D), where $$T\text{-up}=(L\text{-}TOA\text{-}U - L\text{-}TOT\text{-}U), \text{ and} \tag{3}$$

$$T\text{-down}=(L\text{-}TOA\text{-}D - L\text{-}TOT\text{-}D). \tag{4}$$

The second calculating unit 203f can be utilized to calculate the position of the MS under consideration (e.g., MS 208) by using the round-trip distance information, D, between that MS and at least three radio base stations (e.g., BS0, BS1, BS2).

As an option, the second calculating unit 203f can also use any reported direction of arrival (DOA) information if available from antenna arrays to determine the MS's position. In this case, the position of the MS can be determined merely from the round-trip distance, D, and DOA information with respect to one BS. As such, that MS is located at a certain azimuth (DOA) and distance from the BS involved.

The storage unit 203c maintains the known positions of the network's radio base stations (e.g., BS0, BS1, BS2). The receiving unit 203b and sending unit 203d provide a means for the service node MPC 203 to communicate with the network controller (MSC 202), and also with subscribers requesting/receiving MS position information (e.g., using a Short Message Service or SMS feature).

In operation, assume that MS 208 is a MS whose position is to be determined. The bi-directional link 211 shown represents a signal connection (e.g., a call) between MS 208 and its serving BS0. The MSC 204 sends an order message via connection 211 to MS 208 which orders MS 208 to perform the position determination functions. The MS 208 transmits via connection 211 its reported local signal transmission and arrival times, which are received by BS0 and conveyed to the MSC 202. The uplink signal connections 212 and 213 (to BS1 and BS2, respectively) each represents a position determination sequence transmitted on the uplink and received by BS1 and BS2. For this exemplary embodiment, this position determination sequence information need only be a predefined time mark. Similarly, the downlink signal connections 214 and 215 (from BS1 and BS2, respectively) each represents a position determination sequence transmitted on the downlink by BS1 and BS2, and received by MS 208. For this embodiment, this position determination sequence information need only be a predefined time mark. However, for a different embodiment, these predefined time marks can be implemented as pilot signals transmitted by BS1 and BS2 in a CDMA or WCDMA system.

The distance from the neighboring base stations (BS1, BS2) to the MS (208) can be determined with the above-described round-trip position determination method. The distance from the serving base station (BS0) to the MS (208) can be determined with a conventional Time Advance distance measurement method (e.g., in a TDMA system), or a conventional matched filter distance measurement method (e.g., in a CDMA or WCDMA system). These distances between the MS (208) and the base stations (BS0, BS1, BS2), along with the known BS location information, are then used in a triangulation algorithm to determine the MS's position.

FIG. 2 is a schematic block diagram of a radio base station and mobile radio station, which are structured in accordance with the preferred embodiment of the present invention. For this embodiment, the radio base station BS1 (or BS2, . . . BSn) and mobile station MS 208 are part of a WCDMA system. BS1 includes a transmission antenna 301 and two receiving antennas 302. The pair of receiving antennas 301 advantageously provides space diversity for the radio traffic, and also for the present invention's uplink measurements. BS1 also includes a transmitter section 303, receiver section 304, and a matched filter 305 preferably implemented as a Finite-Impulse-Response (FIR) filter. The FIR filter 305 (connected to receiver section 304) utilizes a conventional timing technique to determine the instant an uplink signal 309 arrives at BS1, which is to be used for the present method of determining the position of MS 208. A control unit 306 reads from a local clock 308 (via connection 307 from FIR filter 305 at the reported instant) the local time-of-arrival uplink (L-TOA-U), and conveys this information along with the associated radio channel identity information to MSC 202.

MS 208 is structured to implement the inventive MS position determination method in a way that corresponds to that of BS1. For this embodiment, MS 208 includes a transmit/receive antenna 321, which is connected to a receiver section 324, transmitter section 323, and transmitter/receiver section 323. A matched filter 325 (also implemented as a FIR filter) is connected to receiver section 324. The FIR filter 325 utilizes a conventional timing technique to determine the instant a downlink signal 310 arrives at MS 208, which is to be used for the present method of determining the position of MS 208. A control unit 326 reads from a local clock 328 (via connection 327 from FIR filter 325 at the reported instant) the local time-of-arrival downlink (L-TOA-D), and conveys this information along with the associated radio channel identity information to MSC 202 via a signalling path 329, transmitter/receiver section 330, antenna 321, air-interface 331, and the serving radio base station BS0.

The control unit 326 also generates an uplink signal 309, which is transmitted by MS 208 via transmitter section 323, and antenna 321. The uplink signal 309, which is received by the base station involved (e.g., BS1), is used in implementing the present method of determining the position of a MS. As such, the control unit 326 reads on the local clock 328 the local time-of-transmission (L-TOT-U) for the uplink signal 309, and conveys this information along with the associated radio channel identity to MSC 202. The MSC 202 consults look-up table 204 (FIG. 1) to determine the identity of the mobile station whose position is to be determined (e.g., MS 208). The look-up table also maintains, in addition to the known BS position information, the associated radio channels carrying the respective signals 211, 212, 213, 214 and 215. These signals are stored in the look-up table when the call is set up between the serving base station BS0 and the MS involved (208), and the order message is sent to initiate the present method of determining the MS's position.

FIG. 3 is a flow diagram that shows a method 500 for determining the position of a mobile radio station, which can be implemented by the embodiments shown in FIGS. 1 and 2. For these embodiments, system 200 is a CDMA mobile radio system. At step 501, a request to determine the position of a mobile radio station (e.g., MS 208) is received at service node MPC 203. For example, such a request can come into MPC 203 as a short text message from a subscriber. In response to receiving such a request, at step 502, MPC 203 sends an order message via MSC 202 and serving BS0 to MS 208, which orders MS 208 to initiate the position determination function for itself. The position determination is made using the locations of the serving BS0 and neighboring base stations BS1 and BS2 as inputs to a conventional triangulation algorithm. At step 503, BS0 determines the distance between itself and MS 208, by calculating the round-trip delay (BS0-MS-BS0) using a conventional matched filtering/correlation method, and reports the determined distance information via MSC 202 to MPC 203.

At step 504, the MS 208 measures the local arrival times, L-TOA-D1 and L-TOA-D2, of the (pilot) signals transmitted from BS1 and BS2, respectively, and reports these local arrival times via BS0 and MSC 202 to MPC 203. At step 505, MPC 203 sends an order message via MSC 202 to BS1 and BS2, which orders BS1 and BS2 to "listen" for positioning data which is to be transmitted on the uplink from MS 208 during a specified interval. At step 506, MPC 203 sends an order message to MS 208 via MSC 202 and BS0, which orders MS 208 to transmit the positioning data during the specified interval, and report the exact transmission time (L-TOT-U) via BS0 and MSC 202 to MPC 203.

At step 507, BS1 and BS2 measure the respective local arrival times, L-TOA-U1 and L-TOA-U2, of the positioning data transmitted during the specified interval, using a conventional correlation method. At step 508, BS1 and BS2 report the respective local base station times for the transmitted signals, L-TOT-D1 and L-TOT-D2, and local base station arrival times for the received signals, L-TOA-U1 and L-TOA-U2, to MPC 203 via MSC 202. At step 509, MPC 203 calculates the position of MS 208, using the known BS positions and reported local times in accordance with Equations 2–4 above.

It should be noted that, in accordance with the present invention, the uplink signals from MS 208 may be transmitted at any appropriate time, if the local transmission time is being reported from MS 208. However, in prior art methods, the uplink signals transmitted from a mobile station whose position is to be determined are transmitted at known absolute times related to the serving base station's timing, and the distance between the serving base station and that mobile station. Consequently, as an alternative to the prior art methods, the distance between the serving base station and mobile station can be determined using the present method shown in FIG. 3 for determining the distances between BS1 and MS 208, and BS2 and MS 208, by performing steps 504–508 rather than what is described above for step 503.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for determining the round-trip air-time between a mobile radio station and a first radio base station, comprising the steps of:
    said mobile radio station and said first radio base station each determining a local time of transmission of an uplink signal and a downlink signal respectively;
    said mobile radio station and said first radio base station each determining a local time of reception of said downlink signal and said uplink signal respectively;
    calculating an apparent uplink air-time from said local time of transmission of said uplink signal and said local time of reception of said uplink signal;
    calculating an apparent downlink air-time from said local time of transmission of said downlink signal and said local time of reception of said downlink signal; and
    adding said apparent uplink air-time and said apparent downlink air-time to obtain said round-trip air-time.

2. The method of claim 1, further comprising the step of determining the distance between said mobile radio station and said first radio base station, by multiplying said round-trip air-time by the speed of light divided by two.

3. The method of claim 2, further comprising the steps of determining the position of said mobile radio station, by:
    determining the distance between said mobile radio station and second and third radio base stations, by reperforming the steps of claims 1 and 2 for said second and third radio base stations; and
    triangulating with said distance between said mobile radio station and said first radio base station, said mobile radio station and said second radio base station, and said mobile radio station and said third radio base station.

4. The method of claim 2, further comprising the steps of determining the position of said mobile radio station, by using a time-of-arrival algorithm with more than three radio base stations.

5. The method of claim 2, further comprising the steps of:
    receiving at least one direction of arrival signal for said mobile radio station and at least one radio base station; and determining the position of said mobile radio station from said direction of arrival signal and said distance between said mobile radio station and said first radio base station.

6. The method of claim 2, wherein said calculating, adding and multiplying steps are performed in a mobile communications network service node.

7. The method of claim 1, further comprising the step of determining the round-trip air-time between said mobile radio station and a second radio base station, by reperforming the steps of claim 1 for said mobile radio station and said second radio base station.

8. The method of claim 7, further comprising the steps of determining the position of said mobile radio station, by:
    determining a first radial distance between said first radio base station and said mobile radio station, and a second radial distance between said second radio base station and said mobile radio station, by multiplying each said round-trip air-time by the speed of light divided by two;
    determining a plurality of intersections of said first radial distance and said second radial distance; and
    selecting said position from said plurality of intersections.

9. The method of claim 1, wherein said apparent uplink air-time is equal to the local time-of-arrival for said uplink signal minus the local time-of-transmission for said uplink signal, and said apparent downlink air-time is equal to the local time-of-arrival for said downlink signal minus the local time-of-transmission for said downlink signal.

10. A method for determining the distance between a mobile radio station and a first radio base station, comprising the steps of:
    said mobile radio station and said first radio base station each determining a local time of transmission of an uplink signal and a downlink signal respectively;
    said mobile radio station and said first radio base station each determining a local time of reception of said downlink signal and said uplink signal respectively;
    calculating an apparent uplink air-time from said local time of transmission of said uplink signal and said local time of reception of said uplink signal;
    calculating an apparent downlink air-time from said local time of transmission of said downlink signal and said local time of reception of said downlink signal;
    adding said apparent uplink air-time and said apparent downlink air-time to obtain a round-trip air-time; and
    multiplying said round-trip air-time by the speed of light divided by two.

11. A method for determining the distance of a mobile radio station in a mobile communications system, comprising the steps of:
    setting up a connection between said mobile radio station and a first radio base station in said mobile communications system;
    calculating an apparent uplink air-time and apparent downlink air-time for said connection between said mobile radio station and said first radio base station utilizing a local time of transmission and a local time of reception measured from an associated local clock at said mobile radio station and said first radio base station;
    adding said apparent uplink air-time and said apparent downlink air-time for said connection to obtain a round-trip air-time for said connection; and
    determining a distance for said connection, by multiplying said round-trip air-time for said connection by the speed of light divided by two.

12. The method of claim 11, further comprising the steps of determining the position of said mobile radio station, by:
    determining a first radial distance between said first radio base station and said mobile radio station, and a second radial distance between a second radio base station and said mobile radio station, by multiplying an associated round-trip air-time for said first and said second radio base station by the speed of light divided by two;
    determining a plurality of intersections of said first radial distance and said second radial distance; and
    selecting said position from said plurality of intersections.

13. The method of claim 11, further comprising the steps of determining the position of said mobile radio station, by:

determining the distance between said mobile radio station and second and third radio base stations, by reperforming the steps of claim 11 for said second and third radio base stations; and triangulating said position of said mobile station with said distance between said mobile radio station and said first radio base station, said mobile radio station and said second radio base station, and said mobile radio station and said third radio base station.

14. The method of claim 11, further comprising the steps of determining the position of said mobile radio station, by using a time-of-arrival algorithm with more than three radio base stations connected to said mobile radio station.

15. The method of claim 11, wherein said apparent uplink air-time for each said connection is equal to the local time-of-arrival for a respective uplink signal minus the local time-of-transmission for said respective uplink signal, and said apparent downlink air-time is equal to the local time-of-arrival for a respective downlink signal minus the local time-of-transmission for said respective downlink signal.

16. The method of claim 11, further comprising the steps of determining the position of said mobile radio station, by using at least said distance for said connection and at least one other distance measurement.

17. The method of claim 11, wherein said connection comprises a call.

18. The method of claim 11, wherein said connection comprises a link communicating data.

19. The method of claim 11, further comprising the steps of determining the position of said mobile radio station, wherein said mobile radio station's uplink signals are synchronized with said first radio base station's downlink signals, and said first radio base station is using a known round-trip time delay for said connection between said first radio base station and said mobile radio station.

20. A method for determining the position of a mobile radio station, comprising the steps of:

measuring a round-trip delay between at least one serving radio base station and said mobile radio station;

said at least one serving radio base stations reporting said round-trip delay to a network processor;

said mobile radio station measuring a respective local arrival time of a signal from each of a plurality of radio base stations;

reporting said respective local arrival time of said signal from each of said plurality of radio base stations to said network processor;

said mobile radio station transmitting a position data signal, and reporting to said network processor a local transmission time for said position data signal;

each of said plurality of radio base stations measuring a respective local arrival time for said position data signal;

each of said plurality of radio base stations reporting to said network processor a respective local transmission time for said signal from each of said plurality of radio base stations, and said measured respective local arrival time for said position data signal; and said network processor calculating said position of said mobile radio station with said reported local arrival times and said reported local transmission times for said position data signal and said signal from each of said plurality of radio base stations.

21. The method of claim 20, wherein said mobile radio station transmits said position data signal during a specified time interval, and each of said plurality of radio base stations measures said respective local arrival time for said position data signal during a time interval including at least a part of said specified time interval.

22. The method of claim 20, wherein said network processor calculates said position of said mobile radio station utilizing a time-of-arrival estimation algorithm.

23. A system for determining the distance between a mobile radio station and a first radio base station, comprising:

means for said mobile radio station to determine a local time of transmission of an uplink signal and said first radio base station to determine a local time of transmission of a downlink signal, and said first radio base station to determine a local time of reception of said uplink signal and said mobile radio station to determine a local time of reception of said downlink signal; and processing means for:

calculating an apparent uplink air-time from said uplink local time of transmission and said uplink local time of reception;

calculating an apparent downlink air-time from said downlink local time of transmission and said downlink local time of reception;

adding said apparent uplink air-time and said apparent downlink air-time to obtain a round-trip air-time; and multiplying said round-trip air-time by the speed of light divided by two.

24. The system of claim 23, wherein said processing means comprises a mobile positioning center.

25. The system of claim 23, wherein said downlink signal comprises a pilot signal in a CDMA system.

26. The system of claim 23, wherein said means for each said mobile radio station and said first radio base station to determine a local time of transmission of an uplink signal and a local time of reception of a downlink signal includes a control unit and local clock.

* * * * *

UNITED STATES PATENT AND TRADEMARK OFFICE
CERTIFICATE OF CORRECTION

PATENT NO. : 6,011,974
DATED : January 4, 2000
INVENTOR(S) : Cedervall et al.

It is certified that error appears in the above-identified patent and that said Letters Patent is hereby corrected as shown below:

Column 3, line 44  Replace "raining"
With --training--

Column 4, line 3  Replace "BS1"
With --BS0--

Signed and Sealed this

Twenty-second Day of May, 2001

*Attest:*

NICHOLAS P. GODICI

*Attesting Officer*  Acting Director of the United States Patent and Trademark Office